(12) United States Patent
Beranek

(10) Patent No.: US 11,462,127 B2
(45) Date of Patent: *Oct. 4, 2022

(54) SYSTEMS AND METHODS FOR ACCESSIBLE WIDGET SELECTION

(71) Applicant: Capital One Services, LLC, McLean, VA (US)

(72) Inventor: Nicholas Beranek, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,115

(22) Filed: May 28, 2021

(65) Prior Publication Data

US 2021/0287570 A1  Sep. 16, 2021

Related U.S. Application Data

(63) Continuation of application No. 16/387,219, filed on Apr. 17, 2019, now Pat. No. 11,049,413, which is a
(Continued)

(51) Int. Cl.
*G06F 3/048* (2013.01)
*G09B 21/00* (2006.01)
(Continued)

(52) U.S. Cl.
CPC ......... *G09B 21/006* (2013.01); *G06F 3/0236* (2013.01); *G06F 3/0482* (2013.01);
(Continued)

(58) Field of Classification Search
CPC ..... G09B 21/006; G09B 21/00; G06F 3/0236; G06F 3/0482; G06F 3/04842;
(Continued)

(56) References Cited

U.S. PATENT DOCUMENTS

2006/0090138 A1  4/2006 Wang et al.
2008/0195455 A1  8/2008 May et al.
(Continued)

*Primary Examiner* — Haoshian Shih
(74) *Attorney, Agent, or Firm* — Finnegan, Henderson, Farabow, Garrett & Dunner, LLP

(57) ABSTRACT

Methods and systems are disclosed for enabling item selection in a widget. An example method comprises receiving at an electronic device, from a server, code instructing the electronic device to display a widget having a grid comprising one or more cells configured for point-and-click selection. The method further comprises displaying the grid in accordance with the received code and sending information associated with a currently selected cell to an assistive system on the electronic device. The method further comprises configuring the electronic device for keystroke operation of the widget. The method further comprises identifying a non-entry keystroke, and in response, determining a new cell associated with the grid, selecting the new cell, and sending information associated with the new cell to the assistive system for output to the user. The method further comprises identifying an entry keystroke and, responsive thereto, sending information associated with the new cell to the server.

20 Claims, 6 Drawing Sheets

Related U.S. Application Data continuation of application No. 14/842,069, filed on Sep. 1, 2015, now Pat. No. 10,311,751.

(60) Provisional application No. 62/053,739, filed on Sep. 22, 2014.

(51) Int. Cl.
| | |
|---|---|
| *G06F 3/04842* | (2022.01) |
| *G06F 3/0482* | (2013.01) |
| *G10L 13/04* | (2013.01) |
| *G06F 3/04892* | (2022.01) |
| *G06F 3/0489* | (2022.01) |
| *G06F 3/04895* | (2022.01) |
| *G06F 3/023* | (2006.01) |
| *G06F 9/445* | (2018.01) |
| *G10L 13/00* | (2006.01) |
| *G06F 9/451* | (2018.01) |

(52) U.S. Cl.
CPC ........ *G06F 3/0489* (2013.01); *G06F 3/04842* (2013.01); *G06F 3/04892* (2013.01); *G06F 3/04895* (2013.01); *G06F 9/44526* (2013.01); *G09B 21/00* (2013.01); *G10L 13/00* (2013.01); *G10L 13/04* (2013.01); *G06F 9/451* (2018.02); *G06F 2203/04805* (2013.01)

(58) Field of Classification Search
CPC .............. G06F 3/0489; G06F 3/04892; G06F 3/04895; G06F 9/44526; G06F 9/451; G06F 2203/04805; G10L 13/00; G10L 13/04
See application file for complete search history.

(56) References Cited

U.S. PATENT DOCUMENTS

| | | |
|---|---|---|
| 2009/0007198 A1 | 1/2009 | Lavender et al. |
| 2009/0183090 A1* | 7/2009 | Fujimoto .............. G06F 40/174 715/780 |
| 2009/0288035 A1 | 11/2009 | Tunning et al. |
| 2010/0070872 A1* | 3/2010 | Trujillo ............... G06F 3/04892 715/745 |
| 2010/0153881 A1* | 6/2010 | Dinn ...................... G06F 16/26 715/825 |
| 2013/0066677 A1* | 3/2013 | Killoh ................ G06Q 30/0277 705/7.29 |
| 2014/0249878 A1 | 9/2014 | Kaufman |
| 2015/0120598 A1 | 4/2015 | Fadell et al. |

* cited by examiner

SYSTEMS AND METHODS FOR ACCESSIBLE WIDGET SELECTION

RELATED APPLICATIONS

This application is a continuation of U.S. application Ser. No. 16/387,219, filed on Apr. 17, 2019, currently pending, which is a continuation of U.S. application Ser. No. 14/842,069, filed on Sep. 1, 2015, which issued as U.S. Pat. No. 10,311,751 on Jun. 4, 2019, which claims priority under 35 U.S.C. § 119 from U.S. Provisional Application No. 62/053,739, filed Sep. 22, 2014. The disclosures of the above-referenced applications are expressly incorporated herein by reference in their entireties.

BRIEF DESCRIPTION

Technical Field

The present disclosure relates to systems and methods for enabling the use of assistive technologies to assist in the selection of information.

BACKGROUND

Information can be presented for selection on computer screens in a variety of ways. One way includes using "widgets" that enable the computer to receive a selection of one or more elements from among the presented information. For example, if a user wishes to purchase an item for shipment from a reseller, the user may select his country of residence by using a "drop-down box" containing a list of countries on a web page. The box includes a list of countries that the reseller can ship to. The user can complete the transaction by finding the appropriate country in the list and clicking on it using a mouse.

Some information is better suited for display in other forms. For example, enabling a user to select a date for shipping the purchased item may be accomplished by presenting a grid representing available dates for shipment. The grid may contain a number of cells, each representing the days in a particular week, month, etc. A user then utilizes a mouse to click on the date desired.

These grid representations, however, present challenges for users using assistive technologies to utilize a computer. For example a low-vision or blind user cannot easily utilize mouse-only computer functions and, thus, cannot easily use a mouse to select a cell from a grid representing available dates for shipment. Such users must rely on assistive technologies, like screen-reader software or magnifiers, to utilize such computer functions. While assistive technologies may be able to read the contents of a web page to the user, they may not be able to interpret the data embedded in the grid and present it to the user in a helpful form. For example, screen-reader software may read out every available date in the grid, or may skip over the grid entirely. In either case, the traditional screen-reader software does not guide the user such that the user can successfully select an appropriate date. While a magnifier may enable the user to more clearly view the dates in the grid, the user still needs to use a mouse to select the desired date, which may be difficult for those with mobility impairments or smaller display screens.

Therefore, more efficient methods and systems are needed to enable users with impairments to select information presented in a widget using assistive technologies.

SUMMARY

In certain embodiments, systems and methods are disclosed for enabling selection of items in a widget, such as the selection of a date from a calendar grid. An example method comprises receiving at an electronic device, from a server, code instructing the electronic device to display a widget having a grid. The grid comprises one or more cells configured for point-and-click selection. The method further comprises displaying the grid in accordance with the received code and sending information associated with a currently selected cell to an assistive system on the electronic device for output to a user. The assistive system could be, for example, text-to-speech software, a magnifier, or the like. The method further comprises configuring the electronic device for keystroke operation of the widget based on the sent information. The method further comprises identifying a non-entry keystroke (such as the pressing of an arrow key or of the Tab key), and in response, determining a new cell associated with the grid, selecting the new cell, and sending information associated with the new cell to the assistive system for output to the user. The method further comprises receiving an entry keystroke (such as the pressing of the Enter key) and, responsive thereto, sending information associated with the new cell to the server. Systems and computer-readable media implementing the above method are also provided.

Although some disclosed embodiments are discussed primarily in the context selecting date on a grid representing a calendar, disclosed embodiments may also be used in other contexts. For example, disclosed embodiments may be used to select letters in a name, to select digits in a Personal Identification Number, to select pictures as part of a memory game, or the like. Disclosed embodiments may also be used to select information from widgets other than grids, such as drop-down boxes.

Some embodiments of the disclosure are usable for improving computer-based (or other electronic device-based) assistive technologies. In particular, some embodiments are directed to improving the usability of point-and-click graphical user interfaces (GUIs) for computers or devices connected to such assistive technologies. Embodiments of the disclosure are also usable to enable better use of computers or other electronic devices for users without full vision, by enabling non-sighted usage of devices and interfaces that normally require a sighted user.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION

Figure 1:
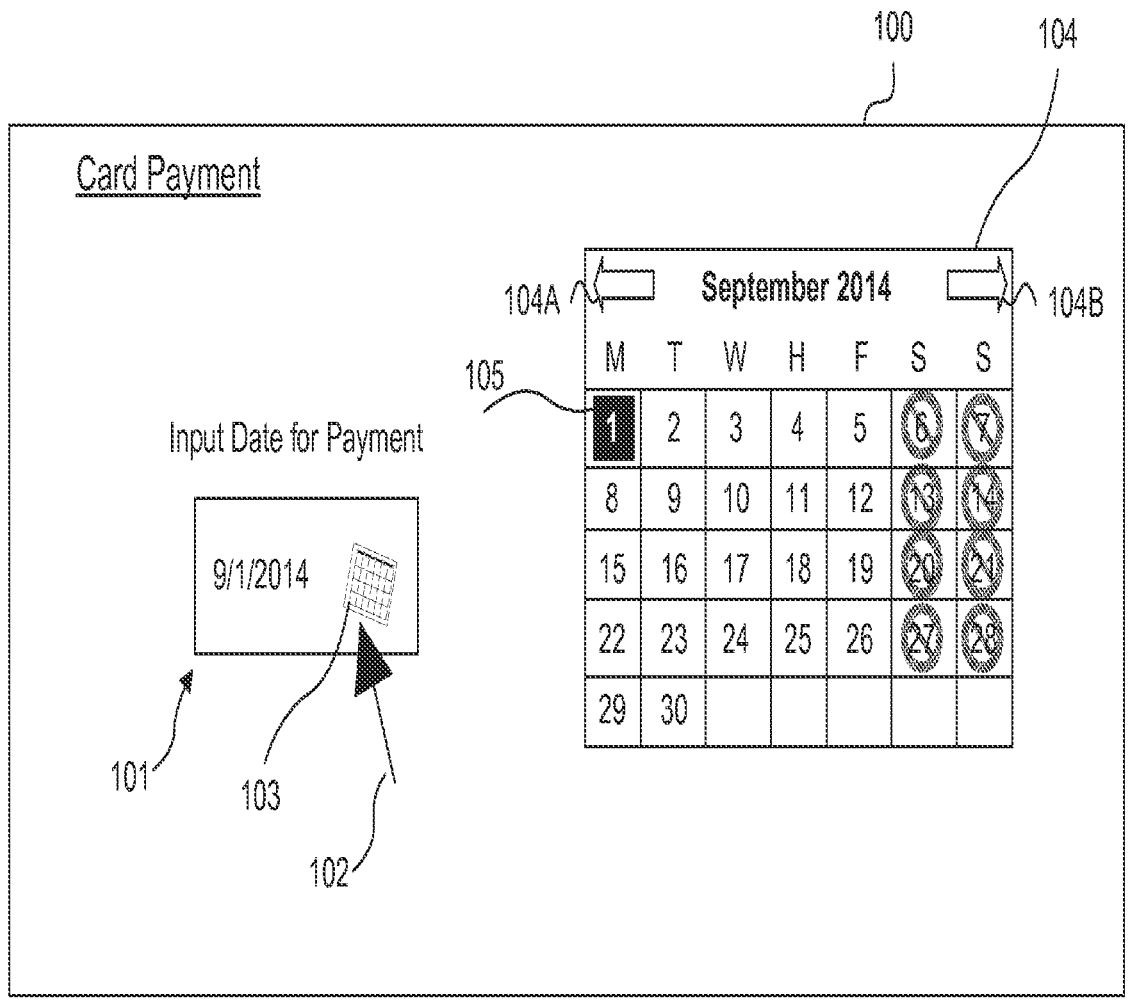
FIG. 1 is a diagram of an example display including a selectable grid, in accordance with the disclosed embodiments.

Reference will now be made in detail to exemplary embodiments of the present disclosure, examples of which are illustrated in the accompanying drawings. Wherever convenient, the same or like reference numbers will be used throughout the drawings to refer to the same or like parts.

It is to be understood that the disclosure is not limited in its application to the details of construction and to the arrangements of the components set forth in the following description or illustrated in the drawings. Embodiments consistent with the present disclosure encompass variations in addition to those described and can be practiced and carried out in various ways. Also, it is to be understood that the phraseology, terminology, and structure employed herein are for the purpose of explanation and example, and should not be regarded as limiting.

As such, those skilled in the art will appreciate that the conception upon which this disclosure is based may readily be utilized as a basis for designing other structures, methods, and systems for carrying out explicit embodiments of the present disclosure or other embodiments. For example, while many embodiments in this disclosure relate to enabling a user to select a date on a calendar grid, other embodiments are possible as well. The disclosed embodiments may be used in any situation where a user has the ability to select an item from a series or set of items.

Embodiments consistent with the present disclosure include computer-implemented methods, tangible non-transitory computer-readable mediums, and computer-implemented systems. Computer-implemented methods consistent with the present disclosure may be executed, for example, by one or more processors that receive instructions from a non-transitory computer-readable storage medium. Similarly, systems consistent with the present disclosure may include at least one processor and a memory device (such as a non-transitory computer-readable storage medium).

As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage media. Disclosed computer-readable storage medium may store instructions for execution by at least one processor, including instructions for causing the processor to perform steps or stages consistent with the embodiments described herein.

FIG. 1 is a diagram of an exemplary display 100 including a selectable grid 104, in accordance with the disclosed embodiments. Display 100 may be, in some embodiments, part of a web page delivered to an electronic device (such as a computer, smart phone, tablet, or the like). Display 100 includes components such as a text box 101, a calendar icon 103, and a grid 104. Exemplary display 100 may enable the electronic device to receive user input regarding, for example, a date for initiating a financial payment. For example, display 100 may be part of a bank's web page. The user may have a financial account associated with that bank. Thus, electronic device may receive a user-selected specified date (here, Sep. 1, 2014) through display 100 on which a payment may be debited from the user's account. A currently selected date may be indicated by selection highlight 105 on grid 104.

Grid 104 may be implemented as a widget presented on display 100. Grid 104 may represent a month in which the currently selected date falls. In some embodiments, grid 104 appears after display 100 receives an input indicating a click on icon 103 using pointer 102 or other interaction with icon 103, text box 101, or display 100. For example, if the currently selected date is Sep. 1, 2014, grid 104 may represent the calendar dates and days associated with September 2014. Each day in that month may be represented by a separate cell that can be interacted with by the user using the electronic device through display 100. A user can modify the currently selected date using the electronic device by clicking on one of the cells in grid 104 using cursor 102, and can select a different month by selecting one of the arrows 104A or 104B. In some embodiments, grid 104 may indicate that certain dates are not selectable by use of a "NO" symbol over those dates. If display 100 receives input indicating an attempt to click on one of those dates, display 100 may present a message (e.g., in a pop-up window, as a sound, or as synthesized speech) that the date is not selectable and that the user should select another date.

Display 100 may be associated with code including "help tags." Help tags may guide users utilizing assistive technologies such as magnifiers, screen-readers, refreshable Braille displays, text-to-speech systems, or the like, in order to understand how to utilize display 100. Help tags may be utilized by such assistive technologies to inform a user of the purpose of each component on display 100, to inform the user how to utilize each component on display 100, to inform the user when a selection has been made on grid 104, or the like. For example, text box 101 may be associated with a help tag that informs a user that pressing the "Enter" key will present grid 104 on the screen and select today's date. As another example, selection highlight 105 may be associated with one or more help tags that inform a user what the currently selected date is, which components to interact with in order to advance the month or select a date, or that a date selected by the user is not selectable (e.g., the crossed-out dates on the weekends in grid 104).

Figure 2:
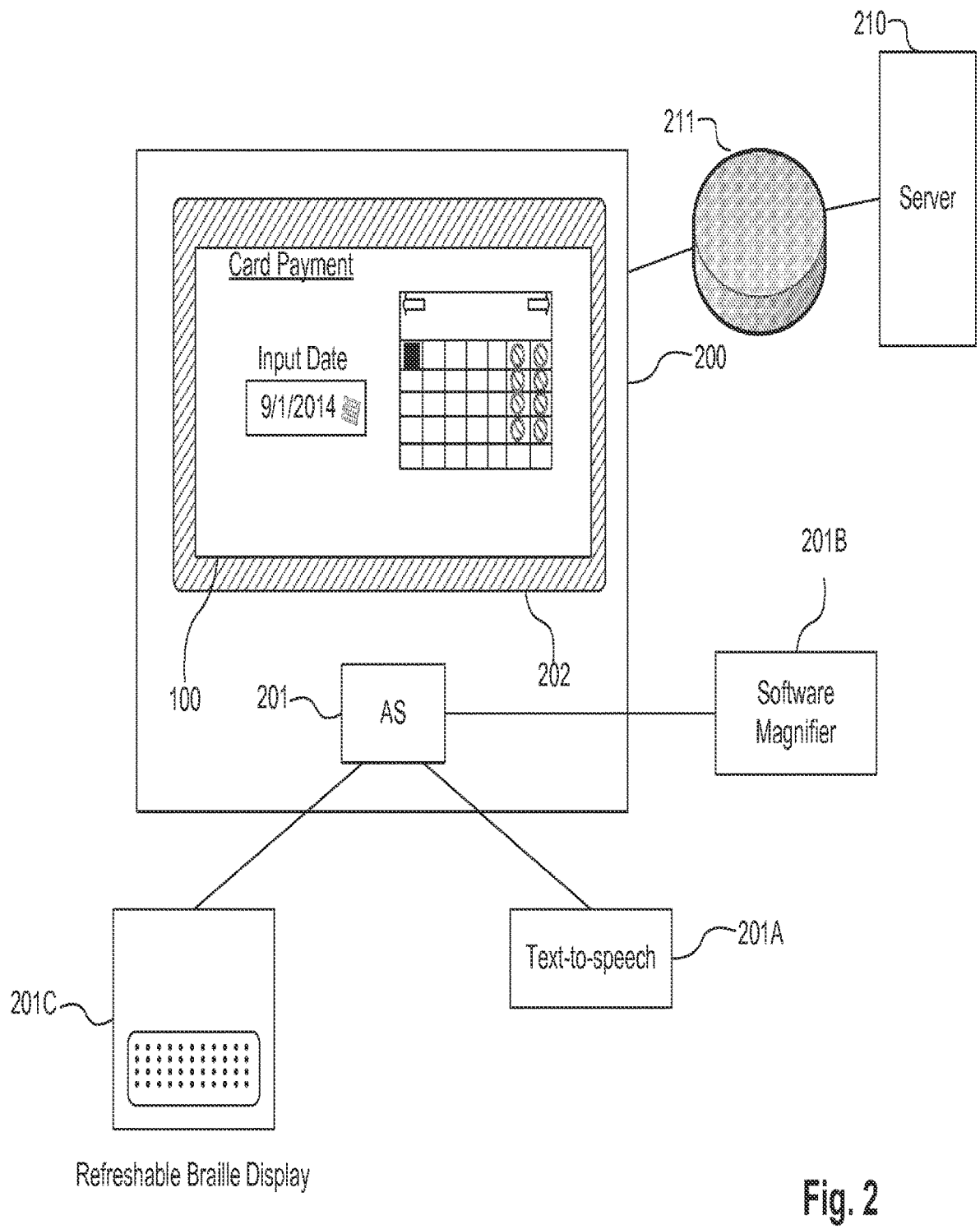
FIG. 2 is a diagram of an example device for use with the disclosed embodiments.

FIG. 2 is a diagram of an example device 200 for use with the disclosed embodiments. Device 200 may be, in some embodiments, a personal computer, a tablet, a mobile device, a smartphone, or the like. Device 200 includes a screen 202, which may be, for example, a monitor, a touchscreen, or the like. Device 200 presents display 100 on screen 202, which enables a user to interact with display 100 and the components thereof (as explained above with reference to FIG. 1). Device 200 may receive input from a variety of systems or input modes. Input can be in the form of a joystick interaction (e.g., joystick movement or a button press), a mouse interaction (e.g., a mouse movement or button click), a keyboard interaction (e.g., a key press), a voice command (e.g., spoken into a microphone), a touchscreen interaction (e.g., a swipe in one or more directions on a touchscreen), the movement of a ball or roller device, an interaction with another physical device (such as an eye tracking device, a bite switch, a sip-and-puff switch, or a foot switch), or the like. One of ordinary skill will understand that input can take many forms and are not limited to these example systems.

Device 200 also includes Assistive System (AS) 201. AS 201 may be implemented as an interface in software, hardware, or firmware. AS 201 accesses or otherwise receives help tags and other information from device 200, and presents the received help tags and other information through an assistive device such as a text-to-speech 201A (which generates synthesized speech from text information; also referred to as text-to-speech software), a software magnifier 201B (which magnifies text displayed on display 100), a refreshable Braille display 201C (which outputs text in Braille form using movable round-tipped pins), or other assistive technology.

In some embodiments, AS 201 may be a separate piece of software, hardware, and/or firmware that interfaces with display 100 and one or more of text-to-speech 201A, software magnifier 201B, or refreshable Braille display 201C to deliver information to user 202. For example, AS 201 may be implemented as an Application Programming Interface, such as the Microsoft Active Accessibility API. AS 201 may also be implemented as a software package configured to interact with assistive technologies by providing data to and receiving input from such assistive technologies. AS 201 may also be implemented as a web browser plugin, a web browser extension, a web browser add-on, or the like, that enables a web browser to provide data to and receive input from such assistive technologies.

In other embodiments, AS 201 may represent one or more of text-to-speech 201A, software magnifier 201B, or refreshable Braille display 201C, and display 100 interacts with the particular assistive system without using an intermediate system.

Device 200 may be connected to server 210 over network 211. Network 211 may be, for example, the Internet, a Local Area Network, an intranet, or any other type of wired or wireless network. Server 210 may be implemented as a web server that delivers web pages to device 200 over network 211 and receives input from device 200.

Figure 3:
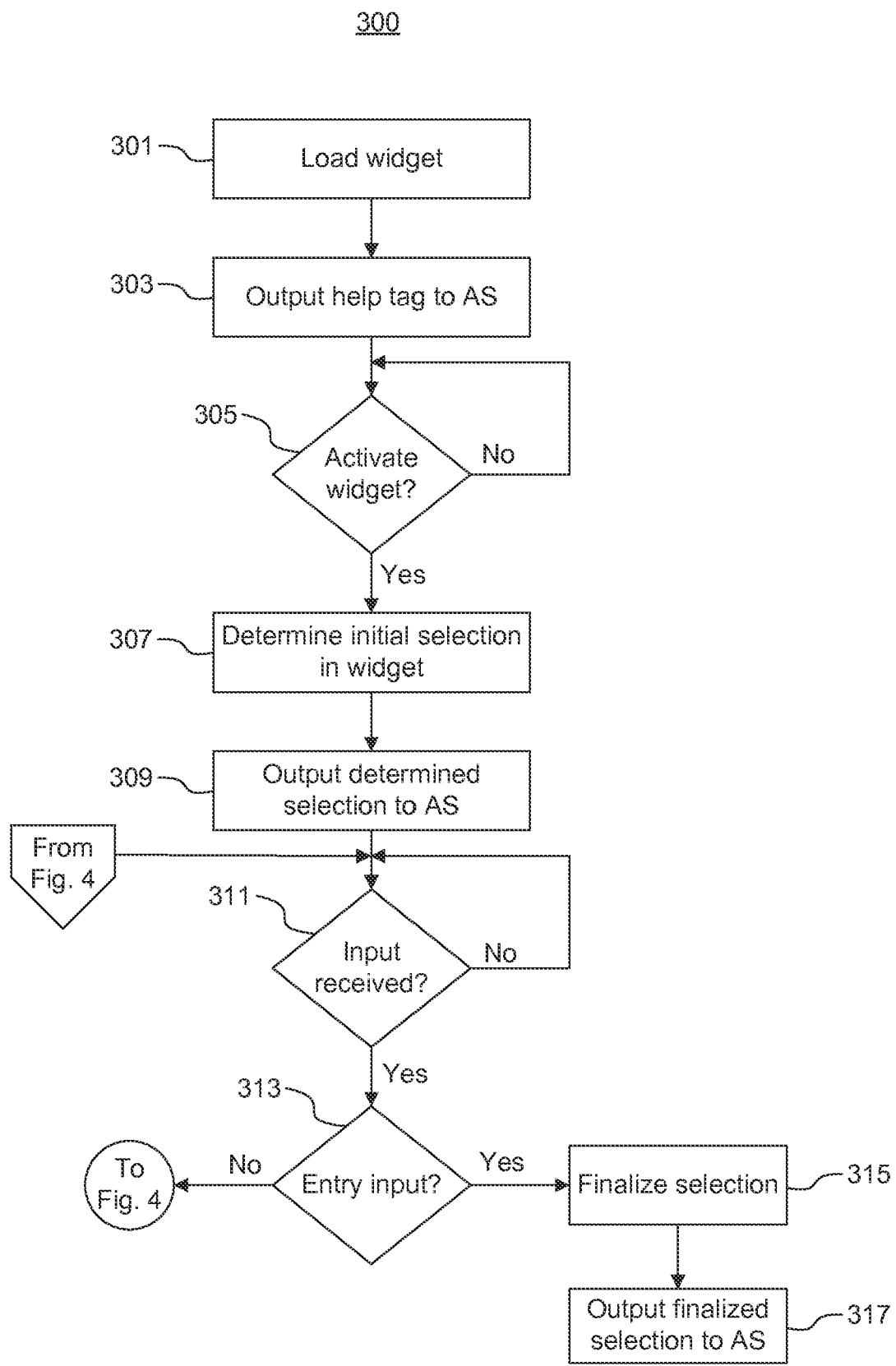
FIG. 3 is a diagram of a method for receiving and displaying a widget, in accordance with the disclosed embodiments.

FIG. 3 is a diagram of an exemplary method 300 for receiving and displaying a widget, in accordance with the disclosed embodiments. In some embodiments, the steps in method 300 are executed on device 200 (from FIG. 2), such as a computer, tablet, or smartphone. Method 300 begins with step 301. In step 301, display 100 receives code that instructs display 100 to display a widget. The widget may be, for example, a calendar grid indicating a selectable set of dates in one or more months. In step 303, a help tag associated with at least one of the displayed widget or another component of display 100 is outputted to assistive system (AS) 201. For example, in step 303, help tags such as "Press enter to begin selecting a date" or "The current focus is on the text box for entering a payment date" may be outputted to AS 201. Other help tags are possible as well, such as help tags that inform the user what the purpose of the widget is (e.g., what it represents), which cell is currently selected on the widget, etc.

In step 305, device 200 determines whether the widget should be activated. In some embodiments, device 200 may make the determination based on whether device 200 has received an indication that the user intends to activate the widget, such as by receiving a click on the widget, a click on an icon associated with the widget, a tap on a touchscreen, a key press of the Enter key or one or more other keys (indicated, for example, in a help tag associated with the widget), or the like. For example, on a web page with many different input fields, a user may not intend the widget to immediately gain focus because other input fields on that page may be important as well. For example, if the web page enables a user to pay a credit card bill, the user may first wish to input a numerical amount to pay before selecting a date to pay the bill.

If device 200 determines to activate the widget (step 305; Yes), the method continues to step 307. In step 307, device 200 determines the initial selection in the widget. In some embodiments, the initial selection could be today's date, a default date for payment of a credit card (such as, for example, a due date for payment), or the like. This date may be highlighted on the widget to indicate that it is the currently selected date. In step 309, device 200 outputs the determined selection to one or more assistive technologies associated with device 200. For example, device 200 may output the current selection in spoken form to text-to-speech software (e.g., "The currently selected date is Sep. 1, 2014"). Other information may also be output to the one or more assistive devices associated with device 200, such as instructions on how to change cells with the widget (e.g., "press the left arrow key to decrease the current date by one day, the right arrow key to increase the current date by one day, the up arrow key to go to the previous week, and the down arrow key to go to the previous week"), information about the widget itself (e.g., "the currently selected date is the first Monday of the month," "your payment is due on September 19th," etc.), instructions on how to interact with the widget (e.g., "press Enter to select the current date as the payment date," "press Escape to stop interacting with the grid," "type a question mark to get further help," etc.), or the like.

After outputting information to the one or more assistive technologies, the method continues to step 311 where device 200 determines whether input has been received. In step 311, device 200 waits to receive input from the user. The input can be in the form of a joystick interaction (e.g., joystick movement or a button press), a mouse interaction (e.g., a mouse movement or button click), a keyboard interaction (e.g., a key press), a voice command (e.g., spoken into a microphone), a touchscreen interaction (e.g., a swipe in one or more directions on a touchscreen), the movement of a ball or roller device, an interaction with another physical device (such as an eye tracking device, a bite switch, a sip-and-puff switch, or a foot switch), or the like. One of ordinary skill will understand that input can take many forms and are not limited to these example systems.

Once input is received in step 311, the method continues to step 313. In step 313, device 200 determines whether an "entry" input was received. An entry input could be interpreted, for example, as an indication by the user to finalize the selection of a currently selected cell in the widget. For example, if the widget is implemented as a grid that represents available dates on a calendar, an entry input by the user indicates that the user wishes to finalize the selection of that date. Entry inputs can take many forms, and would be distinguished from non-entry input forms in that the non-entry input forms would not finalize the currently selected date. For example, entry inputs might comprise a particular key on a keyboard (such as the Enter key or the spacebar), a particular action on a physical switch (such as a hard bite on a bite switch or a hard puff on a sip-and-puff switch), one or more presses on a touchscreen, or the like. If device 200 determines that an entry input has been received (step 313; Yes), the method continues to step 315, where the selection is finalized. Finalizing the selection could comprise, for example, inserting the selection into a text field associated with the widget (such as text field 101 from FIG. 1).

The method then continues to step 317, where the finalized selection is output to AS 201, which outputs the finalized selection along with other information (e.g., whether the text box is active after the selection, how to further interact with display 100 and/or widget 104). If, however, the input in step 313 is determined to not be an entry input (step 313; No), the method continues to FIG. 4.

Figure 4:
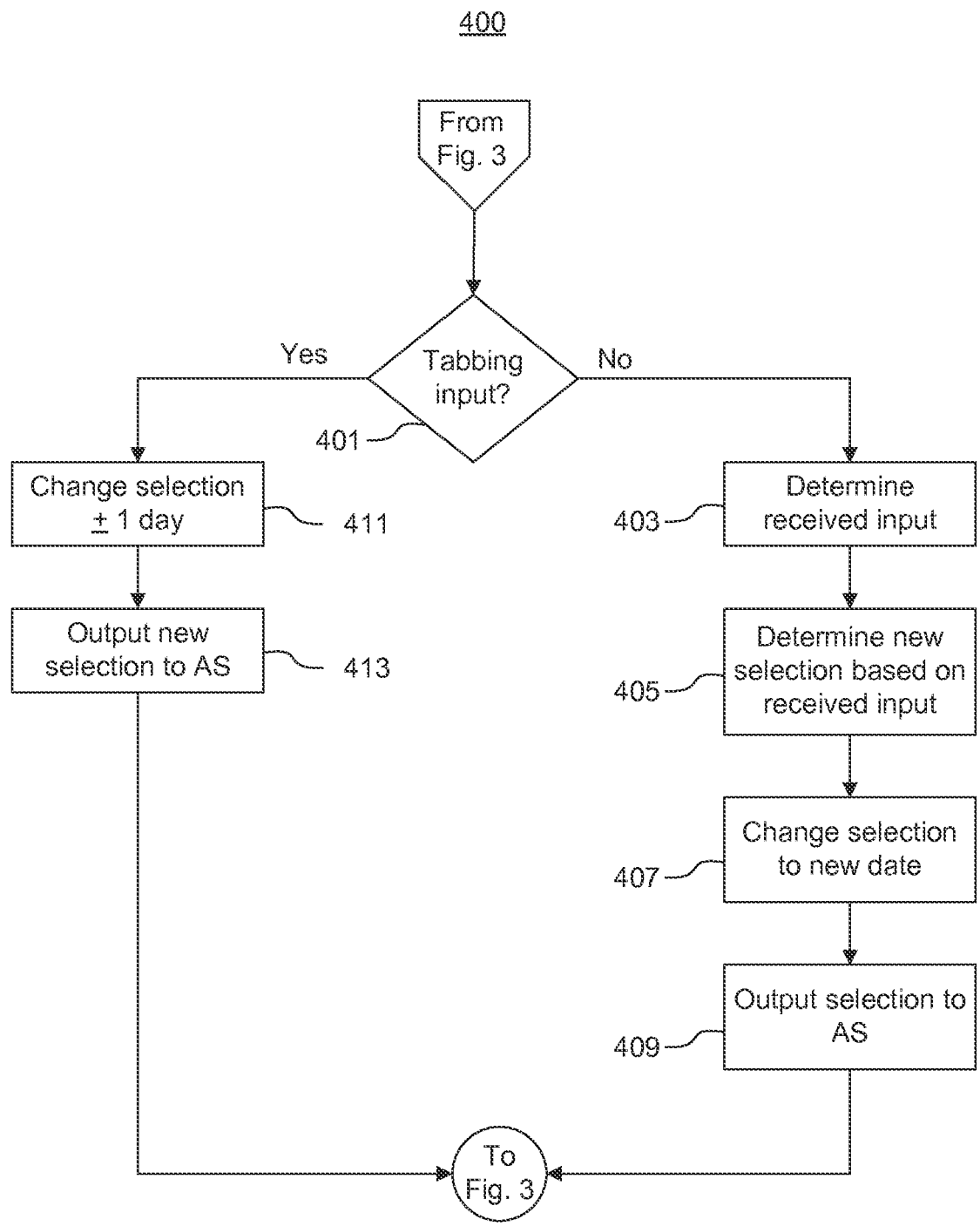
FIG. 4 is a diagram of a method for receiving input from a user and modifying a selection on a widget, in accordance with the disclosed embodiments.

FIG. 4 is a diagram of a method 400 for receiving input from a user and modifying a selection on a widget, in accordance with the disclosed embodiments. Method 400 begins at step 401, where device 200 determines whether the input received in step 311 (of FIG. 3) is a tabbing input.

A tabbing input, in some embodiments, comprises a single key, a set of keys, or physical interaction with an input device, intended to advance or decrease the currently selected cell in the widget by one. For example, a tabbing input may be the "Tab" key, the Spacebar, a swipe from left to right across a touchscreen or other device, or the like. If the widget is implemented as a calendar, for example, the tabbing may advance the current selection to the next day. In some cases, this may involve selecting the first day of the next month, if the current selection is the last day of a particular month.

In some embodiments, device 200 must be in a "Tabbing" mode in order to receive and act upon a tabbing input. If device 200 is not in tabbing mode, a particular key or key combination (e.g., the F2 key, Ctrl+T, etc.) may be required in order to activate the tabbing mode. If device 200 is in tabbing mode, the input of a particular input (such as the Tab key, the Spacebar, or a left-to-right swipe) may effect a tabbing input. One of ordinary skill will understand that other keys and key combinations may be used.

If device 200 determines that a tabbing input has been received (step 401; Yes), method 400 advances to step 411, where device 200 advances or decreases the selection by one cell. For example, if the widget is represented as a calendar, device 200 determines whether to advance the date by one day (e.g., from September 1 to September 2) or decrease the date by one day (e.g., from September 1 to August 31) based on the type of input received. In one embodiment, if device 200 receives a single press of the Tab key, device 200 determines that the intent is to advance the selected date, whereas if device 200 receives two presses of the Tab key within 500 milliseconds of one another, device 200 determines that the intent is to decrease the selected date. Other embodiments are possible as well, such as by providing multiple inputs at once (e.g., holding the Shift key on a keyboard while pressing the Tab key), by providing a touchscreen input (e.g., a right-to-left swipe on a touchscreen or other device) or by providing multiple inputs in succession (e.g., pressing and holding the Shift key on a keyboard for two seconds before pressing the Tab key).

In step 413, device 200 outputs the new selection to AS 201, which outputs the new selection along with other information (e.g., whether a text box is active after the selection, how to further interact with display 100 and/or the widget, what further input is required to send the selected date to a remote device such as server 210, etc.).

If, however, device 200 determines in step 401 that a tabbing input has not been received (e.g., because device 200 is not in tabbing mode or because the received input is a non-tabbing input), method 400 continues to step 403 where device 200 determines what the received input is. For example, device 200 may receive a key press, a puff on a sip-and-puff switch, a bite on a bite switch, or the like.

In step 405, device 200 determines a new selection based on the received input. For example, device 200 may, based on the received input, determine that the user intended to advance the date in a calendar grid by one day. So, if the selected date is Sep. 1, 2014, and the received input indicates intent to advance the selected date by one day, device 200 would determine that the new date should be Sep. 2, 2014. Similarly, if the received input indicates intent to decrease the selected date by one day, device 200 would determine that the new date should be Aug. 31, 2014. In some embodiments, a user may indicate an intent to decrease the selection by providing multiple inputs at once (e.g., holding the Shift key on a keyboard while pressing another key on the keyboard) or by providing multiple inputs in succession (e.g., pressing and holding the Shift key on a keyboard for two seconds before pressing another key on the keyboard).

Other inputs can be provided as well, such as those that navigate the widget in a vertical direction. For example, if the user operates a joystick or other multi-directional device, the user may provide an input to navigate to a different horizontal row on the widget. For example, if a currently selected date on the widget is Sep. 5, 2014, and device 200 receives input indicating intent to move the selected date down by one row, device 200 would determine that the new date should be Sep. 12, 2014.

In step 407, device 200 changes the selection to the new selection determined in step 405. For example, device 200 may move a highlight (such as highlight 105 in FIG. 1) from the previous date to the new date determined in step 405. in step 409, device 200 then outputs the new selection to AS 201 which outputs the new selection along with other information (e.g., whether a text box is active after the selection, how to further interact with display 100 and/or the widget, or what further input is required to send the selected date to a remote device such as server 210).

Figure 5:
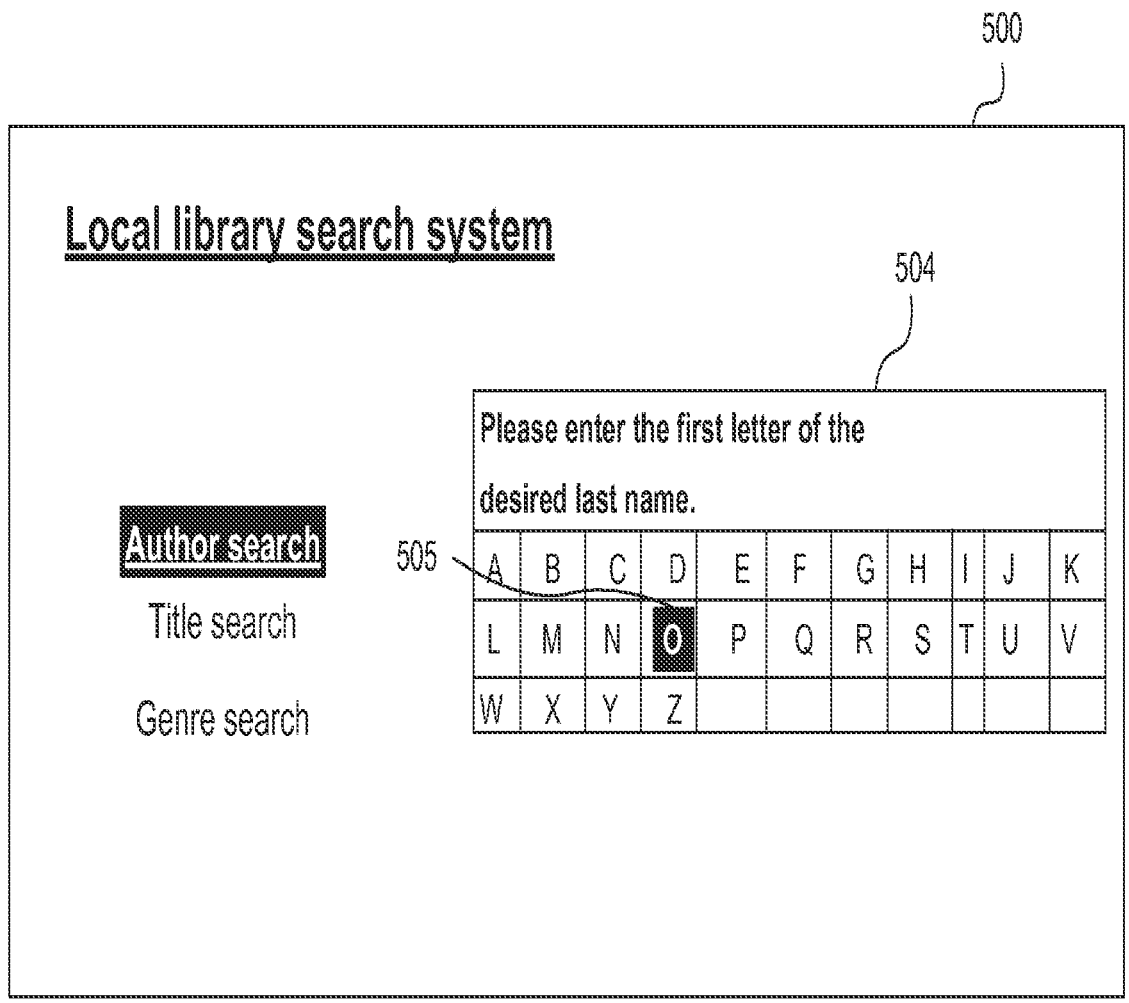
FIG. 5 is a diagram of an example display depicting a grid widget, in accordance with the disclosed embodiments.

FIG. 5 is a diagram of an example display 500 depicting a widget, in accordance with the disclosed embodiments. As explained above, while some disclosed embodiments are explained in terms of a calendar grid that enables a user to select a date, other embodiments are possible as well. Display 500 illustrates an example embodiment of a library search system that enables the user to search for a desired title. Grid 504 contains the letters of the modern English alphabet and asks the user to select the first letter of the desired last name. Device 200 receives input (e.g., according to the embodiments disclosed above with respect to FIGS. 3 and 4) for operating grid 504 and highlight 505 in order to select the first letter of the author's last name. Device 200, after receiving one or more inputs, could then display a list of authors whose last name begins with the selected first letter. In other embodiments, device 200 could then display a second grid (not pictured) requesting that the user input the second letter of the desired last name. Device 200 can continue to present successive grids with letters for selection by a user until the last name is fully selected.

Figure 6:
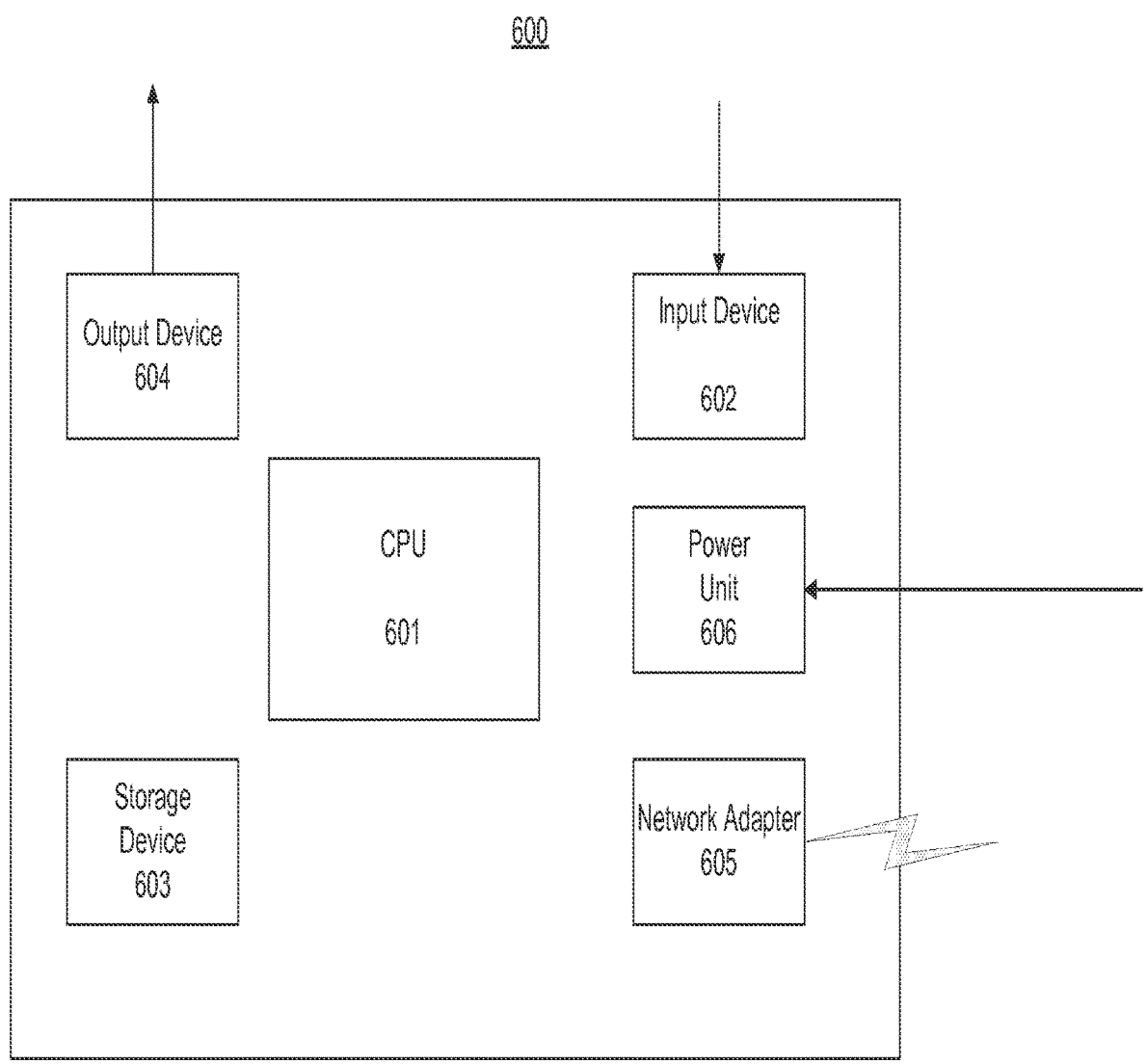
FIG. 6 is a diagram of an example electronic system for use with the disclosed embodiments.

FIG. 6 is a diagram of an example electronic system 600 for use with the disclosed embodiments. Variations of electronic system 600 may be used for implementing device 200 as described in this specification. Persons skilled in the art will also understand, from the present disclosure, that the components represented in FIG. 6 may be duplicated, omitted, or modified.

As shown in FIG. 6, exemplary electronic system 600 comprises a central processing unit 601 (also referred to as an electronic processor) for performing operations consistent with the present disclosure. Electronic system 600 may comprise storage device 603. Storage device 603 may comprise, for example, a magnetic storage device (such as a hard drive), an optical storage device (such as a DVD or CD drive) a flash-based storage device (such as flash memory), or any other type of storage device. Electronic system 600 also comprises network adapter 605. Network adapter 605 allows electronic system 600 to connect to electronic networks, such as the Internet, a Local Area Network (LAN), a cellular network, a satellite network, a wireless network, or any other type of network. Electronic system 600 also comprises power unit 606, which may enable electronic system 600 and its components to receive power and operate fully.

In some embodiments, electronic system 600 also comprises input device 602, which receive input from users and/or modules or devices. Such modules or devices may include, but are not limited to, keyboards, mice, trackballs, trackpads, touchscreens, scanners, cameras, and other devices which connect via Universal Serial Bus (USB), serial, parallel, infrared, wireless, wired, or other connections. Input device 602 may also receive input from assistive technologies (e.g., connected to or part of AS 201) such as joysticks, sip-and-puff devices, foot switches, bite switches, eye tracking cameras, or the like. Electronic system 600 also comprises output device 604, which transmit data to users, modules, or devices such as monitors, televisions, screens, projectors, printers, plotters, speakers and/or headphones, sound systems, or other recording, displaying, or playback devices. Output device 604 may also transmit data to users using AS 201 or other assistive technologies, such as refreshable braille displays, text-to-speech software and/or hardware, magnifier devices, or the like.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, flash memory, solid state disks, CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

What is claimed:

1. A method of enabling keystroke cell selection on an electronic device, comprising:
    displaying, by an electronic device, an entry grid comprising a plurality of entry cells;
    receiving a first selection of a first entry cell of the plurality of entry cells;
    identifying a non-entry keystroke, the non-entry keystroke indicating a request by a user to modify the first selection of the first entry cell;
    determining a direction indicated by the non-entry keystroke;
    determining a second entry cell of the plurality of entry cells that is in the direction indicated by the non-entry keystroke;
    receiving a second selection of the second entry cell;
    outputting to the user:
        first information associated with the second selection; and
        an indication of an interactable entry input that will finalize the second selection;
    identifying an entry keystroke corresponding to the interactable entry input, the entry keystroke indicating a request by the user to finalize the second entry cell as an input into a data field;
    inserting the first information into the data field in response to identifying the entry keystroke; and
    outputting, to the user, second information indicating whether one of the first or second entry cells is active after the second entry cell is finalized as the input into the data field.

2. The method of claim 1, wherein receiving the first selection of the first entry cell comprises receiving a selection of a date.

3. The method of claim 1, wherein the entry grid is displayed in response to receiving a user input.

4. The method of claim 1, wherein at least one of the plurality of entry cells is labeled as not selectable.

5. The method of claim 1, further comprising presenting a help tag associated with one of the plurality of entry cells.

6. The method of claim 5, wherein the help tag is presented using at least one of text-to-speech, a software magnifier, or a Braille display.

7. The method of claim 1, wherein the first entry cell corresponds to a current day or a default payment date.

8. The method of claim 1, wherein the interactable entry input comprises at least one of a keyboard input, a physical switch input, or a touchscreen selection.

9. The method of claim 1, wherein determining the second entry cell comprises:
    determining a third entry cell that is in the direction indicated by the non-entry keystroke; and
    presenting a message that the third entry cell is not selectable.

10. The method of claim 1, further comprising presenting, prior to identifying the non-entry keystroke, an indication of a component to use to perform the non-entry keystroke.

11. The method of claim 1, further comprising displaying, after identifying the entry keystroke, a successive grid comprising a plurality of successive entry cells.

12. The method of claim 11, further comprising:
    receiving an entry keystroke indicating a request by the user to finalize a third selection of one of the plurality of successive entry cells; and
    inserting second information associated with the one of the plurality of successive entry cells into the data field.

13. The method of claim 1, further comprising outputting, to the user, what further input is required to send the first information to a remote device.

14. A system comprising:
    a memory storing instructions; and
    one or more processors configured to execute the instructions in the memory to perform operations comprising:
        displaying, by an electronic device, an entry grid comprising a plurality of entry cells;
        receiving a first selection of a first entry cell of the plurality of entry cells;
        identifying a non-entry keystroke, the non-entry keystroke indicating a request by a user to modify the first selection of the first entry cell;
        determining a direction indicated by the non-entry keystroke;

determining a second entry cell of the plurality of entry cells that is in the direction indicated by the non-entry keystroke;

receiving a second selection of the second entry cell;

outputting to the user:
  first information associated with the second selection; and
  an indication of an interactable entry input that will finalize the second selection;

identifying an entry keystroke corresponding to the interactable entry input, the entry keystroke indicating a request by the user to finalize the second entry cell as an input into a data field;

inserting the first information into the data field in response to identifying the entry keystroke; and outputting, to the user, second information indicating whether one of the first or second entry cells is active after the second entry cell is finalized as the input into the data field.

15. The system of claim 14, the operations further comprising presenting a help tag associated with one of the plurality of entry cells.

16. The system of claim 15, wherein the help tag is presented using at least one of text-to-speech, a software magnifier, or a Braille display.

17. The system of claim 14, the operations further comprising presenting, prior to identifying the non-entry keystroke, an indication of a component to use to perform the non-entry keystroke.

18. The system of claim 14, the operations further comprising, displaying, after identifying the entry keystroke, a successive grid comprising a plurality of successive entry cells.

19. The system of claim 14, the operations further comprising outputting, to the user, what further input is required to send the first information to a remote device.

20. A non-transitory computer-readable medium comprising instructions that, when executed by one or more processors, cause the one or more processors to perform steps comprising:

displaying, by an electronic device, an entry grid comprising a plurality of entry cells;

receiving a first selection of a first entry cell of the plurality of entry cells;

identifying a non-entry keystroke, the non-entry keystroke indicating a request by a user to modify the first selection of the first entry cell;

determining a direction indicated by the non-entry keystroke;

determining a second entry cell of the plurality of entry cells that is in the direction indicated by the non-entry keystroke;

receiving a second selection of the second entry cell;

outputting to the user:
  first information associated with the second selection; and
  an indication of an interactable entry input that will finalize the second selection;

identifying an entry keystroke corresponding to the interactable entry input, the entry keystroke indicating a request by the user to finalize the second entry cell as an input into a data field;

inserting the first information into the data field in response to identifying the entry keystroke; and outputting, to the user, second information indicating whether one of the first or second entry cells is active after the second entry cell is finalized as the input into the data field.

* * * * *